April 30, 1935.    M. F. WATERS    1,999,950
LIQUID AND GAS SEPARATOR
Filed July 11, 1933    2 Sheets-Sheet 1
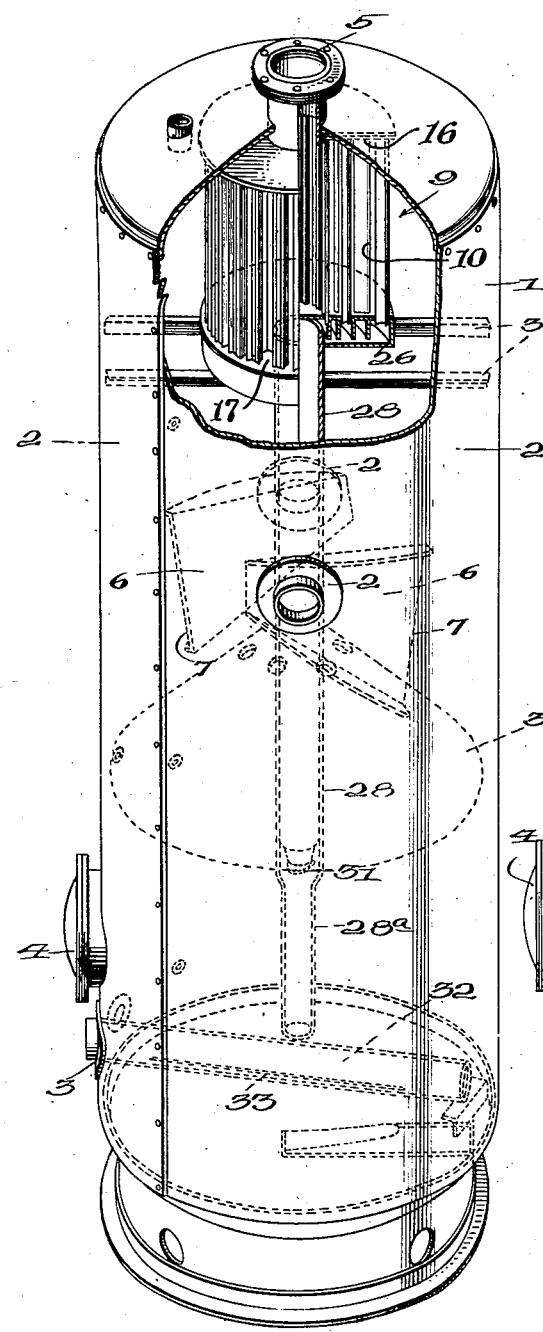
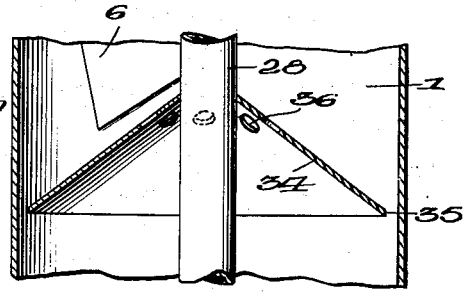
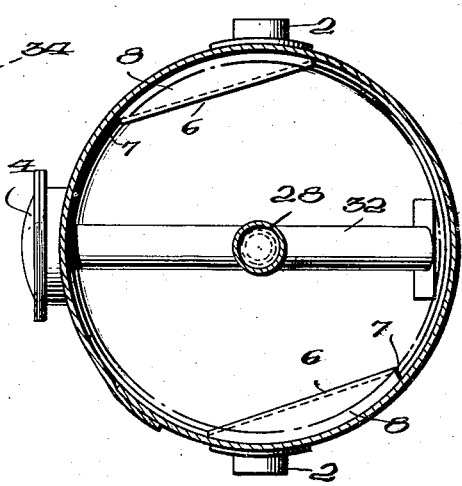
Inventor
M. F. Waters,
By
Attorneys April 30, 1935.   M. F. WATERS   1,999,950
LIQUID AND GAS SEPARATOR
Filed July 11, 1933   2 Sheets-Sheet 2

Patented Apr. 30, 1935

1,999,950

UNITED STATES PATENT OFFICE 1,999,950

LIQUID AND GAS SEPARATOR

Millard F. Waters, Tulsa, Okla., assignor to Hanlon-Waters, Inc., Tulsa, Okla.

Application July 11, 1933, Serial No. 679,963

14 Claims. (Cl. 183—2.7)

My invention consists in new and useful improvements in liquid and gas separators primarily adapted for separating oil and gas, and relates more particularly to improvements on the general principle of structure and operation of the device shown and described in my former Patent No. 1,910,728, issued May 23, 1933. As in the case of my former invention, it is my main object to provide a structure for taking advantage of the principle of differences in the mass or density in the liquids or solids and gases through expansion of the gas which is the carrying agent of the liquid or solid, and including a series of collecting surfaces in direct line with the flow of the mixture.

In other words, the basic principle of the invention resides in the utilization of the effect of the velocity of the fluid to separate and maintain separation of the liquids and gases.

Heretofore in oil and gas separators it has been difficult to prevent the oil from spraying over into the gas line upon a sudden reduction of the pressure carried on the gas line leading away from the separator, due primarily to the momentary increase in velocity of the gas through the separating unit or where the gas leaves the separator, the liquid was mechanically carried over. Also due to the construction of most separating units, the pressure at the top of the down-comer pipes at certain times being less than that at the bottom of the tank, would permit the liquid to immediately enter and rise in the down-comer pipes, coming in contact with the high velocity gas and being carried out therewith.

It is the object of my present invention to eliminate this disadvantage which I accomplish by the application of two principles. First, in place of the separating unit heretofore employed in oil and gas separator tanks including my own former unit, I install a cylindrical unit with a cylindrical chamber in the center thereof which is so designed as to contain at all times more gas at a given pressure than can be taken out of the gas outlet at the top of the tank at the same pressure, thus eliminating a pressure drop through the unit and permitting gas to be fed into said chamber in greater volume than can be discharged therefrom by the gas line at the top of the tank at the same pressure. This prevents an increase in the velocity of the gas regardless of the fluctuation of the pressure in the gas line leading from the separator. Second, I employ a vertical check valve in the liquid down-comer pipe leading from the separator unit to the lower portion of the tank by means of which, if there is a tendency of the oil in the tank to bubble or boil due to the lighter fractions of oil being taken out of the gas or due to the difference in temperature of the oil in the bottom of the tank, which would cause the oil to start back up the down-comer pipe, the backing up of said oil is immediately prevented until such time as the pressure on the inside of the separator is equalized or the weight of the accumulated liquid on the top side of the valve is sufficient to overcome any difference in pressure, whereupon the valve opens to permit the downflow of oil from the separating unit.

A further object of my invention resides in my improved oil outlet by means of which disturbance in the liquid level is prevented by eliminating the possibility of a rush of oil toward the outlet.

A still further object of my invention resides in the design of separating unit which can be constructed so as to equip any conventional tank with as many square feet of surface contact as may be desired, increasing or decreasing the efficiency of the separator by the relative number of square feet of surface contact in the separating unit. With my design, I can provide a maximum of surface contact which together with the principle of expansion are the fundamental factors of liquid and gas separation.

Another object of my invention is to provide means for preventing the liquid in the bottom of the tank from being mechanically picked up due to the velocity of the gas whirling around the inside of the shell.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Fig. 1 is a perspective view of my improved oil and gas separator equipment with a portion of the tank wall broken away to illustrate the structure of the separating unit or mist extractor per se, the latter also being shown partly in section.

Fig. 2 is a transverse sectional view taken on line 2—2 of Fig. 1.

Fig. 3 is a sectional view through a portion of the tank showing the conical baffle for preventing the liquid in the tank from being mechanically picked up.

Figure 4:
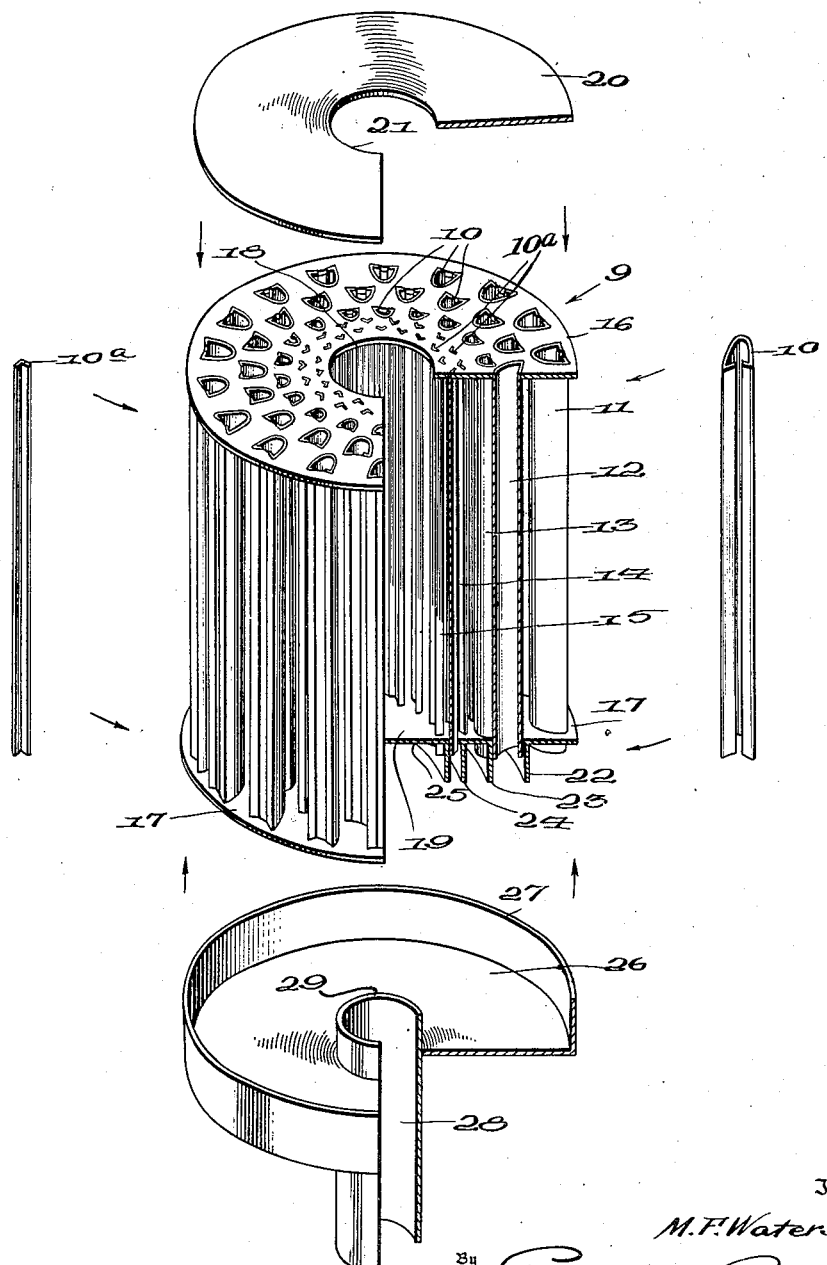
Fig. 4 is a partially disassembled view of the separating unit showing the structure of the various component parts thereof.

In the drawings, 1 respresents a conventional oil and gas separator tank having one or more inlet flanges 2 through which a mixture of oil and gas from the well or wells is introduced into the tank, an oil outlet 3 adjacent the lower extremity of the tank, a clean-out manhole 4, and a gas outlet 5 in the top of the tank. Immediately adjacent each of the inlets 2 I provide an inlet baffle or deflector 6 which is secured to the inner wall of the tank by welding or other suitable means and comprises a flat plate which extends across the tank immediately behind the inlet flange, said plate being directed at a slight downward angle as shown in dotted lines in Fig. 1 and flaring towards its discharge end 7, its opposite end closely engaging the inner wall of the tank. The upper and lower extremities of the plate 6 are bent at right angles toward the shell of the tank to form flanges or wings 8, the edges of which are shaped to correspond with the contour of said shell and rigidly secured to the latter by welding.

These inlet baffles are so constructed that immediately back of the inlet the baffle has the capacity of the inlet flange and then begins to flare principally at a downward angle toward the discharge end of the baffle, the space between the discharge end of flat plate 6 and the shell of the separator being approximately one inch, but the baffle having such vertical dimensions as to have the capacity of the inlet. The vertical opening 7 in the end of the baffle is restricted, and due to its flare and angle of discharge, oil and gas entering the tank are spread out in a thin film and directed in a circumferential path around the shell of the separator as will hereinafter appear. It will be noted that in order to provide for an expansion of the mixture of oil and gas as it enters the separator, the combined areas of the oil and gas outlets leading from the separator are greater than the combined areas of the inlets leading into the separator.

In the upper portion of the tank 1, I provide a mist extractor or separating unit 9 which is substantially cylindrical in shape and comprises a plurality of vertically disposed separating elements or baffles 10 arranged in a series of coaxial circular rows in staggered relation as clearly shown in Fig. 3. The individual separating elements 10 are constructed essentially in the same manner as those shown and described in my former Patent No. 1,910,728 hereinbefore referred to, and consist of elongated tube-like structures substantially semi-circular in cross section at their rear extremities, their side walls being straight and flaring slightly outwardly toward their forward extremities. The vertical forward edges of the side walls are bent inwardly toward one another at an angle of substantially 45° to form inwardly directed flanges, the free edges of which are spaced apart to leave a vertical opening within and substantially centrally of the forward extremity of each member 10. Thus when these baffles or separating elements are arranged, as before mentioned, in co-axial circular rows in staggered relation, spaces or passageways are provided between each baffle, which passageways gradually expand toward the axis of the separating unit, each passageway being in direct line with the vertical opening of the respective baffle of the row next behind.

Due to the fact that the diameter of the rows of baffles decrease toward the axis of the separating unit and in order to provide an efficient assembly following out the principle of operation embodied herein, it is desirable to correspondingly decrease the size of the individual separating elements or baffles 10 toward the axis of the unit, and I have found that a thoroughly satisfactory unit may be constructed by employing my regular standard size baffles in the two outer rows 11 and 12 and correspondingly reducing the size of the third row of baffles 13, the next two rows of baffles being made up of vertically disposed angle irons or the like 10a, the first row of angles 14 with which the gas contacts, being preferably of 80° and the next row 15, preferably 90°.

It will be understood that the rows of baffles 14 and 15 may be composed of members constructed in accordance with the shape of the members 10 suitably reduced in size, but from a practical and economical standpoint, I have found that the angle irons are entirely satisfactory to perform the desired function at this stage of the separation. However I do not wish to limit myself to the specific combination of separating elements shown in Fig. 4.

These vertical baffles are retained in their proper relative positions by means of circular plates or discs 16 and 17, said plates being punched to accommodate the ends of the baffles. The top plate 16 is provided with a central opening 18 but the bottom spacer plate is solid with the exception of the perforations provided for the accommodation of the baffles. The upper ends of the baffles are flush with the top surface of the spacer plate 16 while their lower ends extend through the bottom spacer plate 17 for a predetermined distance, preferably about two inches. It will be seen that this arrangement provides a cylindrical separating unit, the periphery of which is open for the admission of fluid to the separator elements or baffles, the central portion of the unit within the confines of the innermost baffles forming a cylindrical gas chamber 19 closed at its lower extremity and open at its upper extremity through the reduced aperture 18.

The various rows of baffles together form a series of irregular passageways which radiate from the axis of the unit with their outer extremities opening into the upper portion of the tank and their inner extremities opening into the chamber 19.

In completing the assembly of this unit 9, a top closure plate 20 is secured directly on top of the spacer plate 16 and welded around its outer edge, thus sealing the upper extremities of the baffles 10 and 10a, the central portion of said plate 20 being provided with a circular opening 21 adapted to register with the opening 18 in the top spacer plate 16. On the underside of the bottom spacer plate 17 immediately back of each row of vertical baffles I provide circular skirts or baffles 22, 23, 24 and 25, respectively decreasing in diameter toward the axis of the unit, said circular baffles being welded to the underside of the spacer plate 17 and depending downwardly to a point preferably about two inches below the lower ends of the vertical baffles 10 and 10a.

26 represents a circular liquid accumulator pan which forms the lower extremity of the separating unit and is adapted to be secured in place by welding its upper annular edge 27 to the outer edge of the lower spacer plate 17, the assembled view being shown in Fig. 1. The central portion of the pan 26 is apertured to receive the upper end of a down-comer pipe 28, the latter projecting upwardly through the bottom of the pan 26 a predetermined distance as shown at 29 in Fig. 4.

When this structure is completely assembled, the circular baffles 22, 23, 24 and 25 extend a short distance below the top edge 29 of the down-comer pipe which, as hereinafter set forth, forms a liquid seal for the down-comer pipe.

The separating unit 9 is installed in the upper end of the tank 1 immediately anterior to the gas outlet 5 and is retained in place by angle irons or the like 30 which are secured to the shell of the tank in any suitable manner. The gas outlet connection 5 in the dome of the tank extends downwardly through the dome and through the openings 21 and 18 in the top plate 20 and top spacer plate 16 respectively, and opens into the gas chamber 19 in the central portion of the separating unit 9. It will be noted that the chamber 19 is of a size sufficient to contain at all times and at a given pressure more gas than can be taken out of the gas outlet 5 at the same pressure, thus eliminating a pressure drop through the unit and permitting gas to be fed into the inner chamber 19 in greater volume than it can be discharged therefrom at the same pressure by the gas line connected to the outlet 5.

The down-comer pipe 28 extends vertically downward to a predetermined point in the lower portion of the tank 1, its lower end being preferably reduced as shown in dotted lines at 28a in Fig. 1. Just above the reduced end 28a I provide a flapper valve or vertical check valve 31 which is adapted to open downwardly to permit the flow of liquid extracted from the gas in the separating unit, down to the bottom of the separator tank, but at the same time to prevent the backing up of oil from the tank into the down-comer pipe above the valve 31.

There are times when a separator of this character is required to handle a large volume of gas and a relatively small amount of liquid in which event there is a possibility, due to the circular travel of the gas around the separator shell, that a considerable velocity would be developed in the movement of the gas. In other words, there is a likelihood of creating a vortex within the separator shell which would cause the liquid in the bottom of the separator to be mechanically picked up by the whirling gas. To overcome this disadvantage, I have provided a conical baffle 34 rigidly secured to the down-comer pipe 28 as shown in Figs. 1 and 3. This baffle may be located at any point desired relative to the oil and gas inlets 2 but as shown in the drawings, its position is immediately below said inlets and its lower extremity is preferably spaced apart from the separator for a distance of approximately three inches providing an annular passageway 35 to permit the liquids to flow to the bottom of the tank.

36 represents a plurality of small apertures located near the apex of the baffle 34 in order to permit the upward escape of any gas which might be carried down with the liquid. Otherwise there would be a tendency for such gas to be bound on the underside of the baffle.

32 represents an outlet pipe located in the bottom of the tank immediately adjacent the oil outlet 3 and provided on its underside with a small rectangular slot 33 extending longitudinally of the pipe. This slot is of such a length and width that it has a slightly greater capacity than the oil outlet 3, whereby the liquid level in the tank is more readily maintained at a constant point and the liquid is prevented from rushing toward the outlet opening to cause a disturbance in the liquid level.

Having thus described the construction and assembly of my improved oil and gas separator, its operation is as follows:—

A mixture of oil and gas enters the tank through the inlets 2 and is directed at an angle to the inlet and spread out on the inner surface of the separator shell in a thin circumferentially traveling film by means of the flow diverters 6, the liquids or solids following a downward spiral motion on the inside of the shell and the gas an upward spiral motion thereon. By spreading the oil and solids around the inside of the separator, the entrained gas is given an opportunity to become separated from the liquid and the difference in gravity between the two causes the gas to rise and the greater portion of the liquids or solids to drop. The liquids descend to the bottom of the tank through the annular passageway 35 between the conical baffle 34 and the shell of the tank, and as before stated, if there is any tendency of the gas to create a vortex, the baffle 34 prevents the liquids in the bottom of the tank from moving upwardly.

The gas in its circular travel on the inner wall of the separator, comes in contact with a wide surface and leaves the entrained liquids on the wall of the separator, proceeding upwardly and entering the separating unit 9 through the latter's open periphery. This gas first comes in contact with the larger baffles or veins in rows 11 and 12, then the small baffles in row 13 and so on until it enters the gas outlet chamber 19 in the central portion of the unit, from whence it is conducted upwardly through the gas outlet 5.

Although the basic principle of the operation of this separating unit 9 is fundamentally the same as that described in my former patent, the amount of surface contact for the gas is greatly increased for the size of the unit, compared with the box-type unit of my former patent.

The liquid knocked out of the gas in the separating unit travels down the inside of the vertical baffles 10 and 10a and drops from the lower extremities thereof into the accumulator pan 26, where, due to the relative positions of the circular baffles 22, 23, 24 and 25 and the upper edge 29 of the down-comer pipe, a liquid seal is maintained and the gas is prevented from following the liquid down through the vertical baffles and coming up through a back row of baffles. When the liquid in the accumulator pan 26 reaches the level of the top edge 29 of the down-comer pipe, it enters the latter and is carried to the bottom of the separator and as the lower end of this down-comer pipe 28 is submerged in the liquid in the bottom of the tank, a liquid seal is thus maintained at this point.

The check valve 31 in the down-comer pipe 28, as before stated, prevents the oil from backing up in the down-comer pipe which might otherwise be caused due to the lighter fractions of oil being taken out of the gas or due to the difference in temperature of the oil at the bottom, which would ordinarily effect a bubbling or boiling of the oil in the bottom of the tank. Under such conditions, the check valve 14 immediately closes and stops any upward movement of the oil until such time as the pressure on the inside of the separator is equalized or the weight of the oil accumulated in the down-comer pipe on the other side of the check valve is sufficient to overcome any difference in pressure, whereupon the valve opens to permit the continued draining of oil from the unit 9.

The vertical baffles or veins making up the separating unit 9 are so spaced as to give a maximum surface contact, and experiments in the field have shown that with this arrangement there is practically no pressure drop through the element and thus the possibility of liquid being carried over with the gas is eliminated.

Obviously this separating unit can be constructed of any diameter desired with a greater or lesser number of separating elements or baffles. In a five-foot separator I employ a thirty-inch separating unit with an eight-inch circular gas chamber in its center. This unit provides approximately two hundred and fifty-six (256) square feet of surface contact over which the gas passes, and the vertical baffles are so designed that the liquid once on the inside of the baffle or vein is prevented from again coming in contact with the gas and is diverted downwardly into the accumulating pan 26. Now as proof of my statement that there is no pressure drop through the unit, it will be noted that in a thirty-inch unit such as just referred to, the smallest spaces between any of the vertical baffles are those between the small baffles of the last row 15 which in the unit under discussion collectively comprise an open area of 2.1 square feet, as against a six-inch outlet opening from the eight-inch gas chamber through the top. Hence all pressure drop over and above that necessary to cause gas flow and that due to friction, is eliminated.

As before stated, with this design of separating unit, the possibility of oil being mechanically carried over with the gas is eliminated. The unit 9 is suspended in the center of the top portion of the tank and the gas with entrained liquids or solids having followed a circular path around the inside of the shell 1 towards the top, the liquid contained therein gradually decreases as the gas nears the top of the separator. Thus due to the location of the unit in the center of the separator shell, the heaviest liquids and solids have left the gas before the latter enters the unit which permits said unit to act with greater efficiency against the light spray or mist which might be carried in the gas.

It will also be observed that by this arrangement, all gas must pass through the unit before reaching the gas outlet of the tank.

From the foregoing it is believed that the construction and advantages of my invention may be readily understood by those skilled in the art without further description, it being borne in mind that numerous changes may be made in the details disclosed without departing from the spirit of the invention as set forth in the following claims.

What I claim and desire to secure by Letters Patent is:—

1. Apparatus for separating liquid from gas including a tank forming a liquid settling chamber, an inlet opening in said tank, a liquid outlet for said settling chamber, a gas outlet in the upper portion of said tank, a separating unit arranged immediately anterior to said gas outlet, whereby any gases leaving said tank must first pass through said unit, said separating unit including a plurality of vertically disposed substantially trough-like baffles arranged in a series of co-axial circular rows with their mouths opening away from the axis of said unit, the baffles of each row being in staggered relation to the baffles of the adjacent rows and forming a plurality of irregular passageways radiating from the axis of said unit and opening at their outer extremities into the upper portion of said tank, the inner extremities of said passageways terminating in a cylindrical gas chamber disposed centrally of said unit, the baffles nearest said gas chamber being smaller in transverse dimension than the outer baffles, said gas chamber being in communication with the gas outlet of said tank, a liquid receptacle in said unit, and means for conducting the liquids collected therein to said settling chamber.

2. Apparatus as claimed in claim 1 wherein said baffles terminate at their lower extremities in communication with said liquid receptacle.

3. Apparatus as claimed in claim 1 wherein said baffles terminate at their lower extremities in communication with said liquid receptacle, and means adjacent said lower extremities for effecting a liquid seal in said receptacle to prevent the passage of gas across said receptacle.

4. A separating unit for liquid and gas separators comprising a plurality of vertically disposed substantially trough-like baffles arranged in a series of co-axial circular rows with their mouths opening away from the axis of said unit, the baffles of each row being in staggered relation to the baffles of the adjacent rows and forming a series of irregular passageways radiating from the axis of said unit, the outer extremities of said passageways opening at the periphery of the unit and their inner extremities opening into a central cylindrical gas chamber, the baffles nearest the gas chamber being smaller in transverse dimension than the outer baffles, an outlet for said gas chamber at the top of said unit, a liquid receptacle in the lower portion of said unit, and means for conducting liquids therefrom.

5. A separating unit as claimed in claim 4 including means for closing the upper ends of said baffles, their lower ends opening in communication with said liquid receptacle, and a liquid seal adjacent said lower ends to prevent the passage of gas across said receptacle.

6. A separating unit as claimed in claim 4 including spaced plates adjacent the vertical extremities of said baffles for retaining the latter in the proper spaced relation, means for closing the upper ends of said baffles, the lower ends of the same extending through the adjacent spacer plate predetermined distance and opening into said liquid receptacle, circular baffles secured to the undersurface of said last named spacer plate and depending into said receptacle a predetermined distance beyond the lower extremities of the respective baffles to form a liquid seal, and means for maintaining a predetermined liquid level in said receptacle.

7. Apparatus for separating liquid from gas including a tank forming a liquid settling chamber, an inlet opening in said tank, means adjacent said inlet opening for diverting the flow of the mixture entering the tank to cause the same to travel circumferentially of the wall of said tank, a liquid outlet for said settling chamber, a gas outlet in the upper portion of said tank, a separating unit arranged immediately anterior to said gas outlet, whereby any gases leaving said tank must first pass through said unit, said separating unit including a plurality of vertically disposed substantially trough-like baffles arranged in a series of co-axial circular rows, with their mouths opening away from the axis of said unit, the baffles of each row being in staggered relation to the baffles of the adjacent rows and forming a plurality of irregular passageways radiating from the axis of said unit and opening at their outer extremities into the upper portion of said tank, the inner extremities of said passageways terminating in a cylindrical gas chamber disposed centrally of said unit, the baffles nearest said gas chamber being smaller in transverse dimension than the outer baffles, said gas chamber being in communication with the gas outlet of said tank, a liquid receptacle in said unit, a drain pipe leading from said receptacle to said settling chamber, and a check valve in said drain pipe to prevent the oil in said settling chamber from backing up in the drain pipe.

8. Apparatus as claimed in claim 7 wherein said means for diverting the flow of incoming fluid comprises a flat substantially fan-shaped baffle plate secured to the wall of said tank and spaced inwardly from said inlet, the upper and lower edges of said plate being bent toward the shell of the tank to form flanges, and an elongated transversely restricted opening formed between said plate and the shell of said tank, said opening having substantially the exact capacity of said inlet, whereby the fluid entering said inlet is directed circumferentially of the wall of said tank and spread out in a thin film.

9. Apparatus as claimed in claim 7 wherein the lower portion of said settling chamber is provided with a transversely extending pipe opening into the settling chamber at one end with its other end in communication with the liquid outlet, said pipe having a longitudinally extending restricted slot in the wall thereof whereby a disturbance of the liquid level is prevented.

10. Apparatus as claimed in claim 7 wherein the lower portion of said settling chamber is provided with a transversely extending pipe opening into the settling chamber at one end with its other end in communication with the liquid outlet, said pipe having a longitudinally extending restricted slot in the wall thereof, said slot being of slightly greater capacity than that of said liquid outlet, whereby a disturbance of the liquid level is prevented.

11. A separating unit for liquid and gas separators comprising a plurality of vertically disposed substantially trough-like baffles arranged in a series of co-axial circular rows with their mouths opening away from the axis of said unit, the baffles of the respective rows gradually decreasing in transverse dimensions toward the axis of said unit and being arranged in staggered relation to the baffles of the adjacent rows to form a series of irregular passageways radiating from the axis of said unit, the outer extremities of said passageways opening at the periphery of the unit and their inner extremities opening into a central cylindrical gas chamber, an outlet for said gas chamber at the top of said unit, a liquid receptacle in the lower portion of said unit, and means for conducting liquids therefrom.

12. A separating unit as claimed in claim 11 wherein the baffles of at least some of said rows are provided with vertically extending inturned flanges adjacent their mouths.

13. A separating unit as claimed in claim 11 wherein the baffles of some of said rows are provided with vertically extending inturned flanges adjacent their mouths, and the baffles of other rows consist of members which are angular in cross section.

14. A separating unit for liquid and gas separators comprising a plurality of vertically disposed substantially trough-like baffles arranged in a series of co-axial circular rows with their mouths opening away from the axis of said unit, the baffles of the respective rows gradually decreasing in transverse dimensions toward the axis of said unit and being arranged in staggered relation to the baffles of the adjacent rows to form a series of irregular passageways radiating from the axis of said unit, the outer extremities of said passageways opening at the periphery of the unit and their inner extremities opening into a central cylindrical gas chamber, a restricted outlet for said gas chamber at the top of said unit, a liquid receptacle in the lower portion of said unit, means for conducting liquids from the latter, the lower ends of said baffles being in communication with said liquid receptacle, means for maintaining a predetermined liquid level in said receptacle, and a series of circular baffles arranged adjacent the lower extremities of the baffles of each row and depending into the liquid in said receptacle to prevent the passage of gas across said receptacle from one row of baffles to another.

MILLARD F. WATERS.